April 29, 1958 P. B. VARKALA 2,832,399
CONSTRUCTION OF RESILIENT SEATING AND RECLINING SURFACES
Filed May 22, 1956
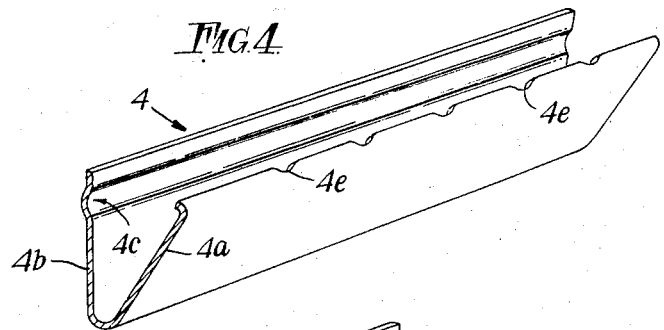
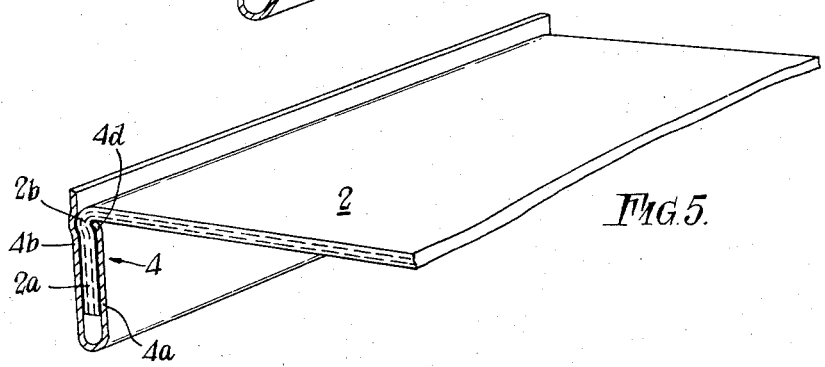
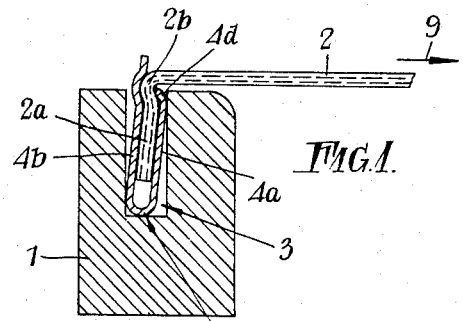
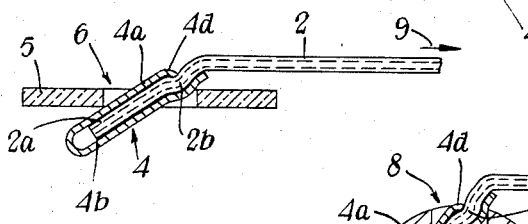
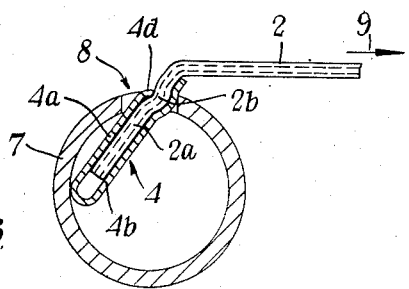

United States Patent Office 2,832,399
Patented Apr. 29, 1958

2,832,399

CONSTRUCTION OF RESILIENT SEATING AND RECLINING SURFACES

Peter Basil Varkala, London, England, assignor to Progress Mercantile Company Limited, London, England, a British company Application May 22, 1956, Serial No. 586,400

Claims priority, application Great Britain July 21, 1955

6 Claims. (Cl. 155—178)

This invention relates to the construction of resilient seating or reclining surfaces for chairs, seats, divans and the like, including transportation seating, the surfaces being of the kind composed basically of elastic webbing strips secured between transverse supporting frame members.

A main object of the invention is to facilitate the attachment of the ends of such strips to the respective frame members without weakening the strips or damaging the members in the attachment area.

Accordingly the invention provides means for attaching an elastic webbing strip to a frame member in the construction of a resilient seating or reclining surface of the kind specified, wherein a rigid reinforcing clip is secured across the strip end and the frame member is slotted or grooved longitudinally to receive the reinforced strip end which, for purposes of insertion, is turned back at an angle to the operational plane of the strip, the arrangement being such that the reinforced strip end will twist and bind in the slotted or grooved frame member when subjected to normal operational tension.

According to a further aspect of the invention there is provided a method of attaching an elastic webbing strip end to a frame member in the construction of a resilient seating or reclining surface of the kind specified, wherein the strip end, which is rigidly reinforced, is turned over at an angle to the strip and entered into a socket in the rail member so that tension on the strip tends angularly to displace the reinforcement in the socket and thereby sets up a binding action between the reinforcement and socket wall or walls.

In order that the invention may be clearly understood and readily carried into effect several embodiments thereof will now be described in detail with reference to the accompanying drawings in which:

Figure 1 is a sectional side elevation showing one end of an elastic webbing strip attached to a grooved frame member in accordance with the invention, Figure 2 is a view similar to Figure 1 but shows a modified form of frame member, Figure 3 is a view similar to Figures 1 and 2 but shows yet another form of frame member, Figure 4 is a perspective detail sectional view showing the reinforcing clip in a partially open position, and Figure 5 is a sectional perspective view and shows the reinforcing clip of Figure 4 clamped to one end of a webbing strip.

In the following description the invention is applied, by way of example, to the manufacture of an ordinary upholstered chair seat having parallel side frame or rail members across which resilient or elastic webbing strips are secured in spaced substantially parallel co-planar relationship for supporting upholstery, cushions and the like.

In Figure 1 of the drawings there is shown one of these rail members 1 with part of an elastic webbing strip 2 having its end 2a attached to the rail 1, it being understood that the opposite end of the strip 2 is attached to the opposite rail member in a substantially similar manner and that the remaining webbing strips which make up the foundation for the chair seat are also similarly secured between the rail members. To receive the strip end 2a, the rail member 1, which is conveniently in the form of a rectangular-section wooden bar, is provided with a groove or socket 3 extending longitudinally of the bar and opening through the upper bar edge. This groove is preferably positioned approximately centrally of the bar and has narrowly spaced flat side walls.

In an alternative arrangement (not shown) the groove could extend at an inclination to the aforesaid upper bar edge or the groove could be cut through the bar at an inclination from a side face of the bar.

The strip end 2a which is inserted into the groove 3 is secured within a metal reinforcing clip indicated generally at 4. This clip 4 is of open-ended channel form, as can be seen more clearly in Figures 4 and 5, and is dimensioned to extend right across the strip end 2a. The depth of one clip wall 4a is approximately equal to the depth of the groove 3 whilst the opposite clip wall 4b is extended upwardly beyond the clip channel mouth. Extending along the length of the clip wall 4b adjacent the upper wall edge is a corrugation forming a recess 4c which opens towards the mouth of the clip channel, the upper edge 4d of the other clip wall 4a being lipped over towards this recess. The lipped wall edge 4d may be provided with spaced indentation 4e therealong.

A clip 4 as described is clamped to each end of an elastic webbing strip 2 after the latter has been cut to the appropriate length. The provision of the recess 4c in the extended clip wall 4b and the lipped-over edge 4d of the opposite clip wall 4a causes a kink 2b to be formed in the webbing when the clip walls are pressed together, which serves greatly to increase the frictional grip of the clip.

To engage the reinforced ends of a webbing strip in the rail grooves, the strip is positioned with the extended clip walls 4b uppermost and the clips are bent back substantially at right angles to the operational plane of the strip 2. The strip is then stretched slightly as required to allow the clips to enter the grooves in the respective rails. By the term "operational plane of the strip" is meant the plane in which the greater part of the strip is located when the strip is operatively positioned between frame members. The strip will be firmly secured across the rails since tension therein, or weight applied normally thereto, will have the effect of tending to angularly displace or twist the clips in their respective grooves so as to set up a binding or wedging action between the clips and groove walls which will ensure that the clips will be frictionally retained against withdrawal. The effect of a weight applied to the supported strip will, of course, be to increase the tension and thus also the wedging or binding force. The direction of the force acting on a reinforced strip end is indicated by arrow 9, a substantially equal and opposite force being normally also applied to the opposite strip end.

In the foregoing, reference has been made to co-planar parallel webbing strips secured between side rails but it will be appreciated that webbing could equally well be interlaced in a conventional manner the strips which run parallel to the side rails being correspondingly secured in front and rear grooved cross-rails. Initial tension in the supported strips can, of course, be obtained by cutting the strips to a length which necessitates slight stretching to engage the clips in the rail grooves as aforesaid.

In the alternative attachment arrangement shown in Figure 2, a plate 5 having a series of slots 6 therein is arranged to receive the reinforced strip ends, one such end being inserted into each slot. Alternatively, the plate 5 could be formed with a single longitudinal slot which receives the reinforced ends of a series of co-planar strips. The plate 5 is arranged for attachment to a frame member of the chair by screwing or in any other convenient manner, so that the slots 6 project beyond the frame member into a clip receiving position. As can be seen from Figure 2 the reinforced strip end in this embodiment is inserted into its receiving slot with the extended clip wall 4b in the lowermost position so that the corrugation which forms the recess 4b bears against the inner lip of the slot 6.

In the further embodiment shown in Figure 3 each rail member takes the form of a tubular bar 7 having one or more clip receiving grooves 8 therein. In this embodiment again the clip is inserted into the slot with the extended clip wall in the lowermost position so that the corrugation in this wall bears against one lip of the groove 8.

It will readily be appreciated that the attachment means as described and illustrated could be modified in various other ways and, in particular, the clip could take various alternative forms, including that of a channel member having walls of equal depth, to meet convenience of manufacture. The provision of such clip makes the attachment of elastic webbing strips extremely simple since nails are no longer required and equally the strips can be renewed without difficulty or damage to the supporting framework. The invention has been described as applied to a chair seat but it will be appreciated that it is equally applicable to a chair back or a divan or any other article of furniture or transportation seating which normally employs webbing as, or as a basis for, a resilient seating or reclining surface.

I claim:

1. In a resilient seating, reclining and like surface composed basically of elastic webbing strips mounted across a frame, the combination of a rigid reinforcing clip secured across a strip end and a frame member which transversely underlies said reinforced strip end and is provided with a slot which opens towards the plane of the strip and has side walls substantially perpendicular to said plane, the reinforced strip end being turned back at an angle to the plane of the strip and projected partially into said slot so as to twist therein and bind against the slot walls when the strip is subjected to normal operational tension.

2. The combination as claimed in claim 1 in which said frame member is constituted by a wooden rail having a relatively deep substantially rectangular section channel slot extending lengthwise of the rail and opening through a rail edge.

3. The combination as claimed in claim 2 in which said reinforcing clip comprises an open-ended channel member, a lip along the upper edge of one channel wall and overlying the channel mouth and a longitudinally recessed extension formed along the upper edge of the other channel wall with the recess opening towards said lip.

4. The combination as claimed in claim 1 in which said frame member is constituted by an elongated metal plate having slots spaced therealong.

5. The combination as claimed in claim 1 in which the frame member is constituted by a tubular rod having at least one peripheral slot extending axially of the rod.

6. In a resilient seating, reclining and like surface including elastic webbing strips stretched across a frame, means for anchoring a strip end comprising a rigid reinforcing open-ended channel clip secured across the strip end and having a corrugation along one wall adjacent the clip mouth, and a frame member which transversely underlies said reinforced strip end and is provided with a slot opening towards the plane of the strip, said reinforced strip end being bent back out of the plane of the strip and wedged in said slot at an obtuse angle to the strip.

References Cited in the file of this patent

UNITED STATES PATENTS

| | | |
|---|---|---|
| 199,824 | Green | Jan. 29, 1878 |
| 898,983 | Melick | Sept. 15, 1908 |
| 2,444,873 | Goldberg | July 6, 1948 |
| 2,622,663 | Burd | Dec. 23, 1952 |